(12) United States Patent
Miller

(10) Patent No.: US 7,063,294 B2
(45) Date of Patent: Jun. 20, 2006

(54) FLAT-PANEL DISPLAY LOCATING TOOL

(76) Inventor: Alan Leslie Miller, 1500 Hill Dr., Los Angeles, CA (US) 90041

(*) Notice: Subject to any disclaimer, the term of this patent is extended or adjusted under 35 U.S.C. 154(b) by 0 days.

(21) Appl. No.: 11/004,740

(22) Filed: Dec. 6, 2004

(65) Prior Publication Data
US 2005/0139737 A1 Jun. 30, 2005

Related U.S. Application Data

(60) Provisional application No. 60/531,945, filed on Dec. 24, 2003.

(51) Int. Cl.
*F16M 11/04* (2006.01)

(52) U.S. Cl. .............. 248/176.3; 248/129; 248/178.1; 248/274.1; 297/423.12

(58) Field of Classification Search ............ 248/176.3, 248/274.1, 279.1, 282.1, 917, 918, 919, 920, 248/178.1, 447, 129, 454; 108/50.01; 297/423.35, 297/423.12
See application file for complete search history.

(56) References Cited

U.S. PATENT DOCUMENTS

| | | | | | |
|---|---|---|---|---|---|
| 4,437,537 | A | * | 3/1984 | Ausmus | 180/313 |
| 4,456,086 | A | * | 6/1984 | Wier et al. | 180/11 |
| 4,809,804 | A | * | 3/1989 | Houston et al. | 180/65.5 |
| 4,848,710 | A | * | 7/1989 | Newman | 248/129 |
| 5,054,771 | A | * | 10/1991 | Mansfield | 463/36 |
| 5,056,864 | A | * | 10/1991 | Cooper | 297/188.21 |
| 5,431,569 | A | * | 7/1995 | Simpkins et al. | 434/29 |
| 6,076,785 | A | * | 6/2000 | Oddsen, Jr. | 248/118.3 |
| 6,644,748 | B1 | * | 11/2003 | Tholkes et al. | 297/423.12 |
| 2005/0139737 | A1 | * | 6/2005 | Miller | 248/176.3 |

* cited by examiner

Primary Examiner—Anita King
Assistant Examiner—Tan Le
(74) Attorney, Agent, or Firm—Cislo & Thomas, LLP

(57) ABSTRACT

A tool for lifting, relocating, rotating, and holding a commercially available flat-panel display/TV screen and other associated operating components within any computer operator's or TV viewer's optimal viewing and reaching positions, as are necessary to suit the requirements of an operator who chooses to work in any upright or neck supported reclined type chair/bed bodily position.

17 Claims, 4 Drawing Sheets

FLAT-PANEL DISPLAY LOCATING TOOL

CROSS-REFERENCE TO RELATED APPLICATIONS

Figure 1:
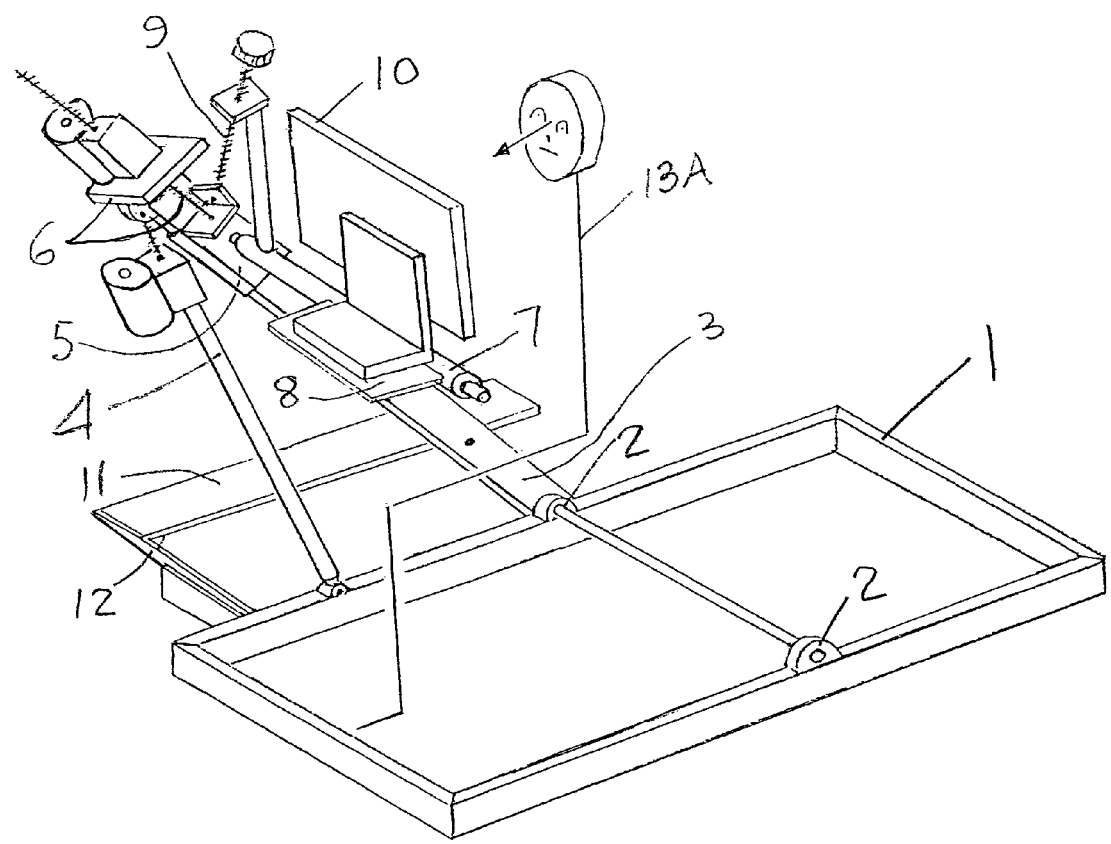

This application claims the benefit of Provisional Patent Application Ser. No. 60/531,945 filed Dec. 24, 2003.

FEDERALLY SPONSORED RESEARCH

Not Applicable

SEQUENCE LISTING OR PROGRAM

Not Applicable

(2) BACKGROUND

Field of Invention

This invention relates to a tool capable of, lifting, locating, positioning and structurally holding a Flat-Panel Display and associated computer hardware as are common in the PC computer or TV industries, in any of the positions as are necessary to suit the computer/TV component operation and the optimum screen viewing needs of:

(2.1) A conventionally seated (desk/table top arrangement) computer operator or TV viewer, (2.2) A semi reclined computer operator or TV viewer, (2.3) A fully reclined (or bed ridden) computer operator or TV viewer.

(3) CURRENT SITUATION

Over the past two decades the desk top personal computer (PC) has become very prevalent. One consequence of this situation is that there now exist many professional computer operators who experience day-in/day-out serious occupational neck and/or back muscle pain problems. In many instances, these problems are due to the conventional seated bodily postures assumed on a daily basis by computer operators who perform long hours of work at desk top computers.

The body postures mandated by to-day's little varying computer component desk-top arrangements can and frequently do result in neck and/or back muscle pain illnesses in many full time computer operators.

The majority of computer operators have, up to now, been compelled to adopt their working posture positions as necessary to suit the surrounding conventional desk top arrangement of the components of their PC computer system. The seriousness of occupational neck and/or back muscle pain problems associated with computer operator posture is illustrated by the fact that approximately 15% to 20% of all of today's chiropractic and accupunctic office visits are by patients seeking neck and back muscle treatment resulting from posture related computer operator work station situations.

A second approaching situation (i.e. the current posture practices of juveniles who engaged in computer action games over long periods of time) points to a more than likely increase in overall population neck and/or back muscle pain problems in the future as these young individuals carry their posture related habits into the future full time computer operator workforce.

(4) OBJECTS OF THE FLAT-PANEL DISPLAY LOCATING TOOL (4.1) To provide a means by which flat panel display viewers who experience systematic neck and/or back pain problems, such as those engaged in day in/day out computer screen viewing work assignments, have the option to safely and ergonomically operate their computer systems whilst in:
  (1) a conventionally seated upright position, or
  (2) a semi reclined position, or
  (3) a fully reclined position.

(4.2) To provide a means of improving overall productivity in the computer industry by enabling conventionally seated computer operators (who are experiencing recurring neck and/or back pain during their routine daily computer assignments) to take up body positions that permit them to achieve a pain reducing, or in many cases a pain eliminating, working environment.

(4.3) To provide a means by which paraplegic or other bed ridden people, who are generally restricted to only looking upwards, can themselves directly control, set and trim the location of a Flat-Panel Display screen to a position over their heads, at right angles to their line of site and at any preferred viewing distance from their eyes.

(4.4) To provide a means to reduce the future national number of Worker's Compensation claims emanating from workers in the computer operator industry. Many of today's Worker's Compensation claims by computer operators are due to computer operators experiencing neck and/or back muscle pains while having to continue their daily work in the same or nearly the same posture that generated those neck and/or back muscle pain problems in the first place. A Flat-Panel Display Locating Tool offers a method of breaking this closed cycle cause and effect situation. When appropriately used the Flat-Panel Display Locating Tool could result in a reduced number of worker's compensation claims (i.e. those specific claims based on neck or back pain computer operator issues) being filed. Such action could result in a corresponding increase in national productivity.

(4.5) To provide a means of Dynamic Concept Design where PC computer systems are utilized to create completely new technical or artistic approaches to product creation and patents using improved mental processing techniques as part of their work assignments. Such improved mental processing techniques are achieved by the computer operator relaxing into the mental pre-sleep "twilight state" between being awake and being asleep. Such mental states were originally defined by Thomas Edison as the "Genius Gap" or "twilight nap" zone. To day they are referred to as the Hypnogogic and Hypnopompic sleep zones. Such mental pre-sleep and wake-up Edison routines are to-day frequently used outside the computer operating industry to develop workable solutions to design item blockages. The range of reclining, relaxed, computer operator working postures permitted by the Flat-Panel Display Locating Tool are, under monitored and appropriate working conditions, conducive to developing such "twilight state" mental transfer of ideas from the reclined computer operator's subconscious mind to the reclined computer operator's conscious mind and thence into new product design.

(5) DRAWINGS

Figure 2:
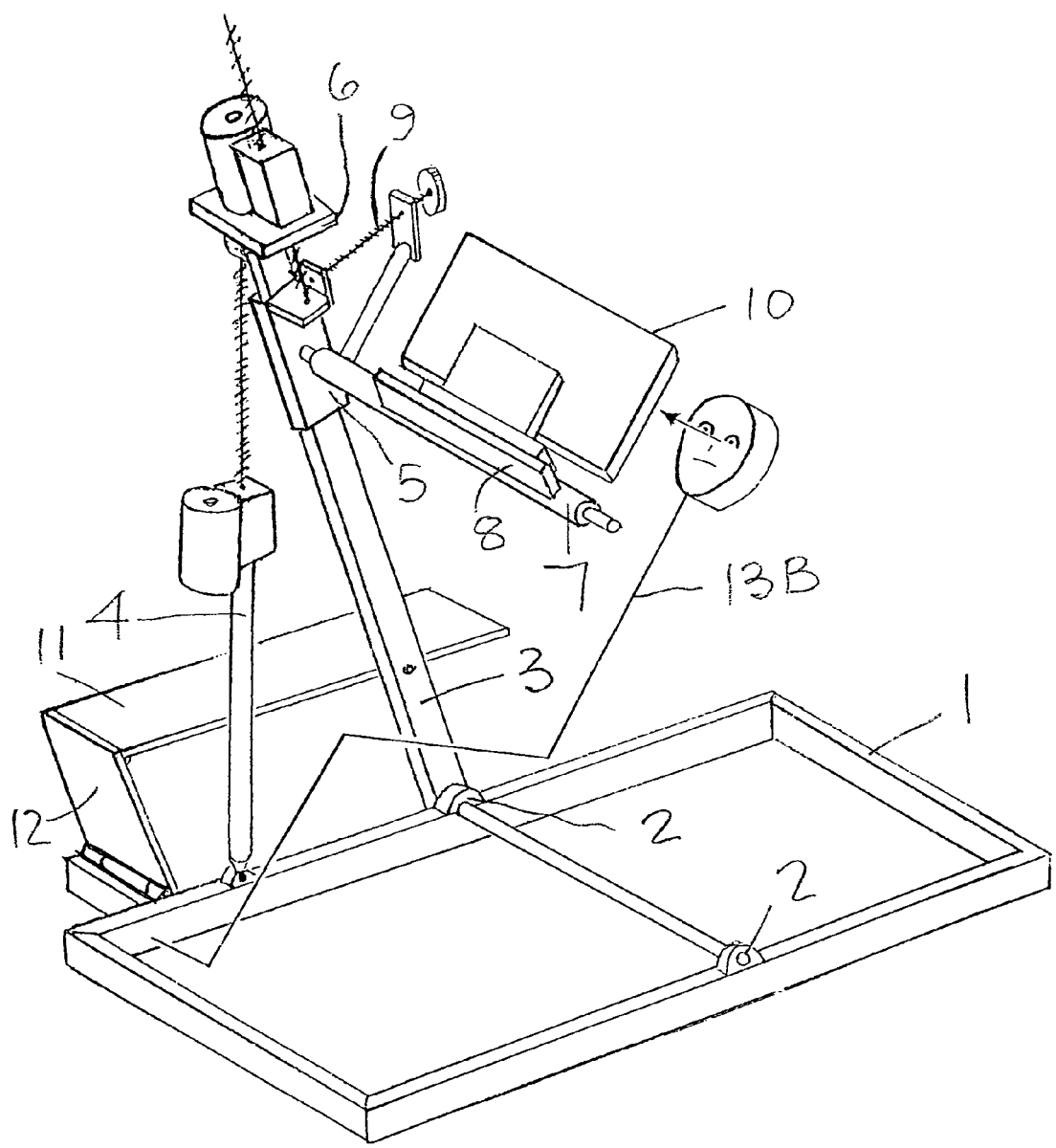
Figure 3:
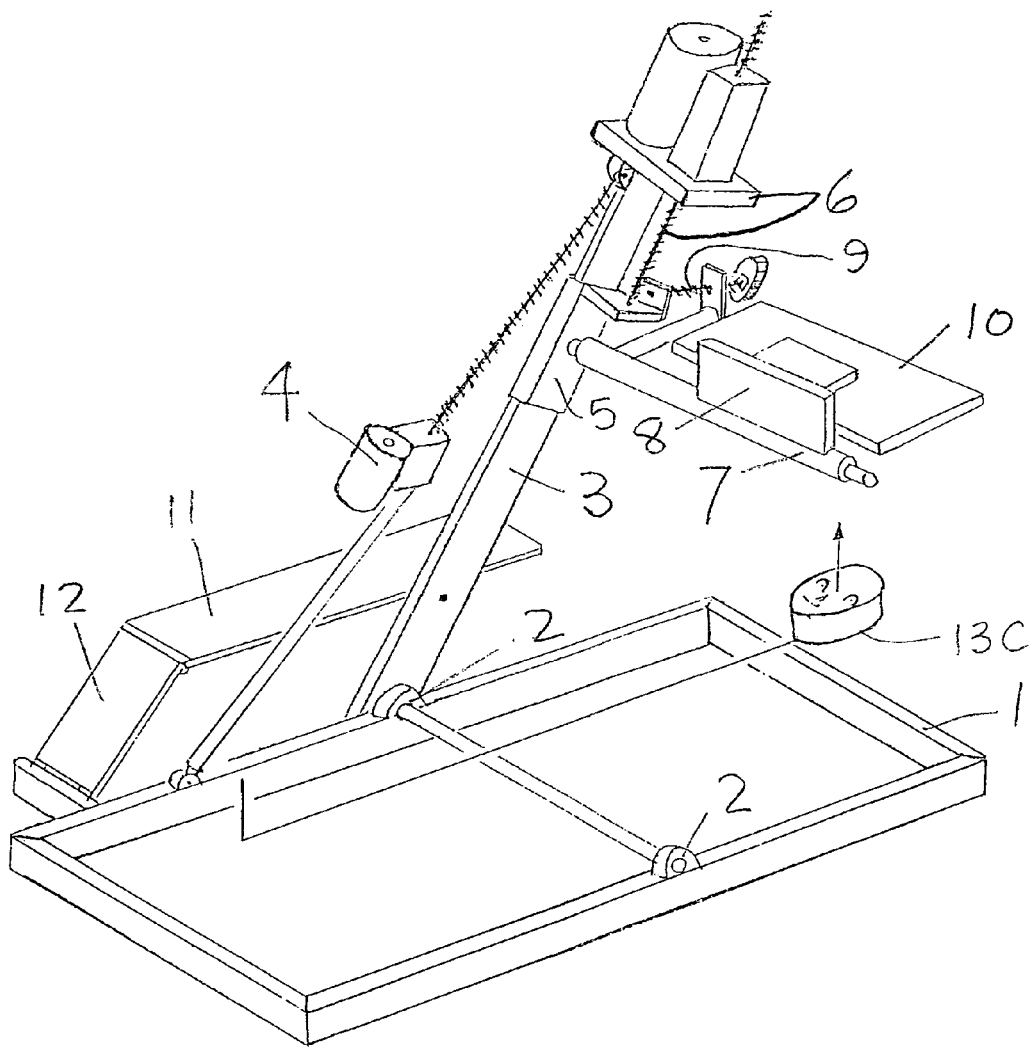
Figure 4:
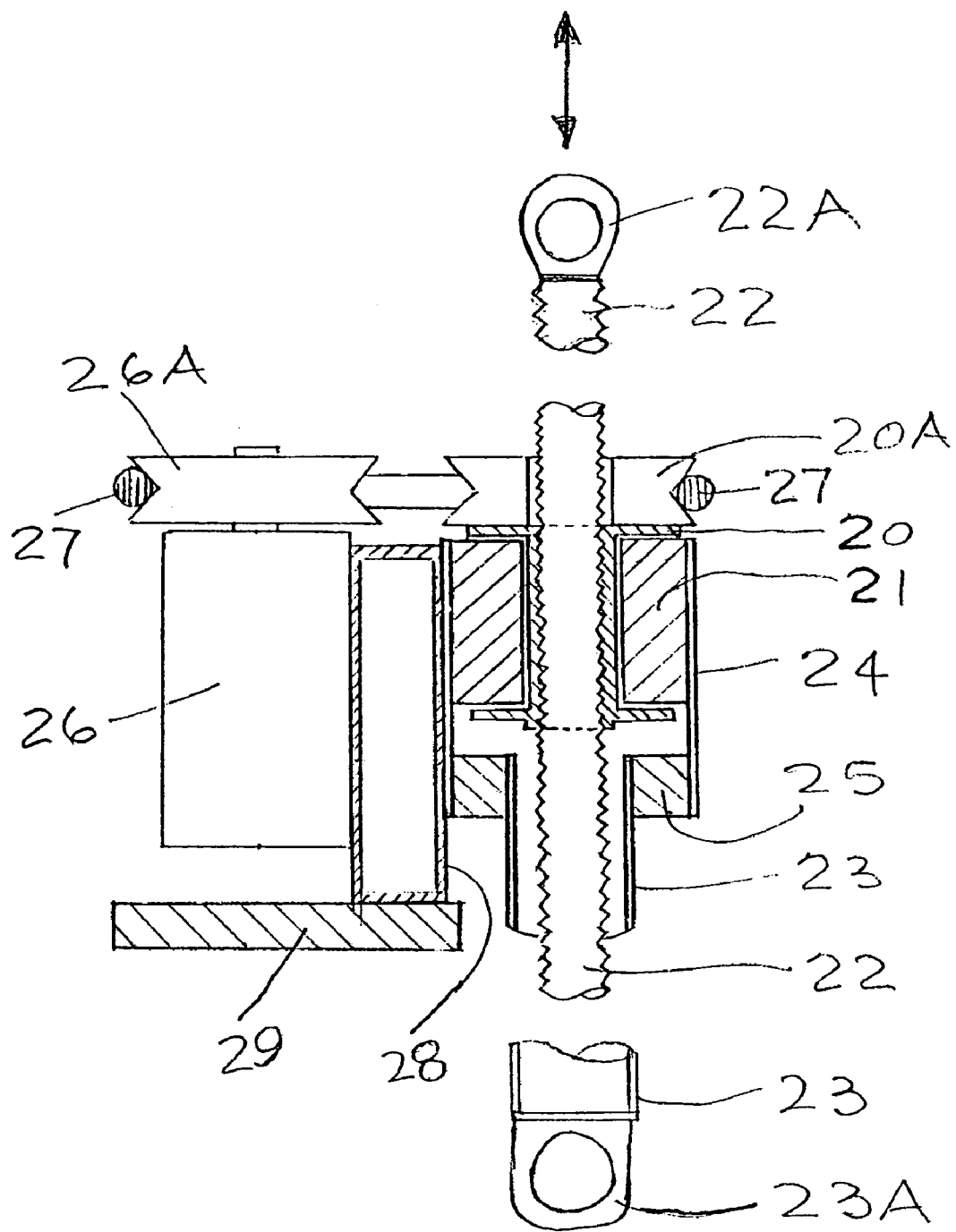

Dwg 1/4.
FIG. 1. Flat-Panel Display Locating tool set in the upright seated position.
Dwg 2/4.
FIG. 2. Flat-Panel Display Locating tool set in the semi reclined position.
Dwg 3/4.
FIG. 3. Flat-Panel Display Locating tool set in the fully reclined position.
Dwg 4/4.
FIG. 4. Section through typical Extendable Strut and Length Adjustable Link drive system (example shown uses the electric motor drive option).

(6) LIST OF REFERANCE NUMERALS

1. Base Frame
2. Base Frame Bearings
3. Radial Arm
4. Extendable Strut
5. Sliding Cantilever Arm Assembly
6. Length Adjustable Link
7. Cantilever Arm Sleeve
8. Monitor Platform
9. Trim Adjustment Link
10. Flat Panel Display
11. CPU Shelf
12. Shelf Leg
13A. Computer Operator in upright seated viewing position
13B. Computer Operator in semi reclined seated viewing position
13C. Computer Operator in fully reclined viewing position
20 Female Threaded Bobbin
20A Bobbin Drive Pulley
20. Thrust blocks
21. Threaded Shaft.
22A Shaft End Connection.
23 Tube.
23A Tube End Connection.
24 Casing.
25 Spacer
26 Motor.
26A Drive Pulley.
27 Drive Belt.
28 Motor Mount.
29 Mounting base

(7) SUMMARY OF INVENTION

The Flat Panel Display Locating Tool is a simple to operate device able to locate, adjust and secure a flat panel display to suit any of the positional needs of a computer operator's working body position options from the conventional seated upright position to the fully reclined position. The Flat Panel Display Locating Tool thus provides the means whereby any computer operator, who has in the past, developed serious neck or back pain problems (due in many cases to prior long periods of upright seated computer use) now has the option to work in a relaxed and pain free position with the head and/or back semi or fully supported by any independent, operator chosen, reclining seat and headrest system.

(8) DETAILED DESCRIPTION (8.1) A Base Frame (1) rests on the floor. The various structural components of the Base Frame surround, lie beyond and where appropriate pass between, the support legs of any typical, adjustable upright-to-recliner type, commercially available, furniture chair. The Base frame does not touch and is independent from the computer operator's chosen configuration of reclinable furniture chair. The Base Frame, having a large footprint provides a stable foundation and also provides attachment connection points as necessary for the other moving structural components of the overall Flat-Panel Display Locating Tool. The Base Frame contains Base Frame Bearings (2) which provide the fulcrum point for the angular rotational movement of a Radial Arm (3).

(8.2) The Radial Arm (3) is a rigid structure secured to the base frame in such a way as to enable it to:

(8.2.1) Radially swing in a plane about its lower end.

(8.2.2) Have the location of its lower end restrained against any vertical and/or horizontal movement.

(8.2.3) Have its lower end able to accommodate and distribute overturning moments and torque forces directly to the Base Frame Bearings (2) and thence to the Base Frame (1) proper. Such overturning moments and torque forces being due to all forces resulting from the weights and positions of all other components attached to, or sliding along, the various sections of the Radial Arm.

A preferred configuration for a structure which satisfies the above criteria is for a stiff "L" shaped Radial Arm (3).

The shorter leg of the "L" shaped Radial Arm is able to transfer other component imposed weight and moment forces to, and rotate in, the Base Frame Bearings (2) which support it.

The longer leg of the "L" shaped Radial Arm is able to radially swing in a plane normal to the centerline passing through the Base Frame Bearings. The longer leg of the Radial Arm carries or is attached to other system components at its upper end.

(8.3) The Radial Arm is structurally held in any desired angular position within its arc of swing by being hinge joint attached, at its upper end, to a motorized Extendable Strut (4).

The lower end of the motorized Extendable Strut (4) is attached by a hinged joint, to the Base Frame (1) thus triangulating the location of the upper end of the Radial Arm (3). The motorized Extendable Strut (4) is able to be dimensionally changed in overall length by an integral electric/mechanical, or hydraulic, or pneumatic energy system. This energy system can be remotely activated by the computer operator. Changing the length of this one (extendable strut) side of the triangle formed by a part of the Base Frame (1), the Radial Arm (3) and the Extendable Strut (4), thus changes the angular position of the Radial Arm (3) about its fulcrum point in the Base Frame Bearings (2).

(8.4) A Sliding Cantilever Arm Assembly (5) slides around and along the upper length of the Radial Arm (3). The Sliding Cantilever Arm Assembly (5) is able to move up and down the Radial Arm (3). The Sliding Cantilever Arm Assembly (5) may be moved along to a computer operator's selected position on the Radial Arm (3) by means of a motorized Length-adjustable Link. (6)

(8.5) One end of the motorized Length-adjustable Link (6) is connected to the Radial Arm (3) and the other end is connected to the Sliding Cantilever Arm Assembly (5). The various positions of the Sliding Cantilever Arm Assembly (5) along the Radial arm (3) are thus dependent on the computer operator's remotely chosen length setting of the motorized Length-adjustable Link (6)

(8.6) A Cantilever Arm Sleeve (7) sits around, and is able to rotate around, that part of the Sliding Cantilever Arm Assembly (5) which protrudes out from the plane of the Radial Arm movement. In this way the Cantilever Arm Sleeve remains near parallel to, and above, the bearing supported shorter leg of the Radial Arm (3). A Monitor Platform (8) is secured to the Cantilever Arm Sleeve (7) and with it is able to rotate around the cantilevered arm component of the Sliding Cantilever Arm Assembly (5).

(8.7) The set of angular rotation of the Cantilever Arm Sleeve and the Monitor Platform around the cantilever arm component of the Sliding Cantilever Arm Assembly (5) is controlled by a manually operated or motorized variable length Trim Adjustment Link (9)

(8.8) The Trim Adjustment Link (9) ties between a joint on the Monitor Platform and an appropriately positioned joint on the Sliding Cantilever Arm Assembly (5).

(8.9) The Monitor Platform is able to support one or more Flat-Panel Display(s) (10). Flat-Panel Displays are commercial components and are available from any PC computer or TV industry supplier. The support base of (each) commercially available Flat-Panel Display (10) is bolted, or otherwise securely attached, to the Monitor Platform (8) upper surface. The computer operators adjustment setting of the angle of the Monitor Platform (8) (and thus the resulting viewing angle of the screen of an attached Flat-Panel Display) is able to be trimmed by the Trim Adjustment Link (9), thus enabling the screen of the Flat Panel Display (10) to be viewer adjusted to a position at right angles to the reclining computer operator's, head and neck supported, upward line of sight.

(8.10) A CPU Shelf (11), suitably sized to accommodate a typical commercially available CPU and appurtenances, is hinge attached at one end to the lower part of the Radial arm (3) The other end of the CPU Shelf is hinge attached and supported by a Shelf Leg (12). The Shelf Leg (12) connects between the CPU Shelf (1) and a branch of the Base Frame (1). Dimensions of components and hinge positions are selected so as to form a parallelogram which, upon movement of the Radial Arm (3), keeps the CPU Shelf (and the CPU mounted on it) horizontal and within easy arm's reach of the computer operator's body, be it in either an upright seated or any reclined position.

(6) OPERATING METHOD (6.1) The computer operator is seated in any conventional, commercially available reclinable chair which is set in the fully upright (non-reclined) position. The Base Frame (1) surrounds and lies beyond, and where appropriate, between the support legs of the reclinable chair. Sitting upright in the chair, the computer operator faces a typical vertically oriented screen of a Flat-Panel Monitor. The Flat-Panel Monitor is held slightly above a typical commercially available computer furniture module desk and is secured to the Monitor Platform component of the overall Flat-Panel Monitor Locating Tool. The CPU is situated on the CPU Shelf. The motorized Extendable Strut (3) is set at near its minimum length. Typical commercial PC key board or graphics board and a mouse/pad are located on the top surface of the adjacent commercially available computer furniture module desk-top unit. In this initial position the computer operator is free to work in today's conventional computer industry's typical upright seated position.

(6.2) Prior to assuming any reclined posture the computer operator lifts the computer system's key board/graphics board and mouse/pad off the top of the furniture desk and places them onto his/her lap.

(6.3) The computer operator, utilizing the facilities of the typical recliner type chair, takes up a chosen, comfortable, head, neck, and back supported, none pain inducing, reclined body work position. The key board or graphics board and mouse/pad remain at rest in the reclined computer operator's lap.

(6.4) The reclined computer operator remotely activates the motorized Extendable Strut (4) which increases in length and causes the Radial Arm (3), Sliding Cantilever Arm Assembly (5) and attached computer Flat-Panel Display (10) to swing upwards and take up a new overhead position with the screen of the Flat-Panel Display somewhat approaching right angles to the computer operator's chosen head supported upward line of sight. (FIG. 2)

(6.5) The reclined computer operator remotely activates the Length Adjustable Link (6) which causes the Sliding Cantilever Arm Assembly (5), to slide up or down the Radial Arm (3), and thus brings the screen of the Flat-Panel Display (10) to the computer operator's preferred viewing distance above his/her eyes.

(6.6) The reclined computer operator manually or remotely adjusts the length of the Trim Adjustment Link (9) as necessary to cause the angle of the screen of the Flat-Panel Display to come to rest at right angles (or at any other chosen angle) to his/her line of sight.

(6.7) The key board or graphics board and mouse/pad are supported in the computer operator's lap and are convenient to operate in an arm/hand ergonomic and stress free manner.

(6.8) The CPU is situated on the CPU Shelf (1) which has, due to its parallelogram linkage governed by the Radial Arm (3), followed the reclining computer operator from its initial position (accommodating upright seated desk-top operation) to a new position alongside the reclining computer operator.

(6.9) The computer operator situated in a partial or fully reclined, adjustable, head, neck, and back supported, relaxed and pain free position starts and proceeds with his/her regular computer work assignment for the day.

(6.10) Upon completion of the work assignment the reclined computer operator remotely activates the motorized Extendable Strut (3) and the Motorized Length Adjustable Link (6) thus moving the Monitor Platform (8) and attached Flat Panel Display (10) up the Radial Arm (3) and out of the way. Once the Monitor Platform (8) and Flat Panel Display (10) are clear, the reclining chair is brought to the upright position, the keyboard/graphics board and mouse/pad are returned, from their location in the operator's lap, to the commercial furniture desk surface. The operator is then clear to get up, and walk away.

(6.11) All computer operator's bodily position selections are accommodated by the Flat-Panel Display Locating Tool. Each positional setting of the screen of the Flat-Panel Display can be adjusted to the optimum operating distance, and at right angle to the view line, of a reclined, head/neck/back supported computer operator. Equipment component positions depends only on the computer operator's remotely chosen setting of the motorized Extendable Strut (4), Sliding Cantilever Arm Assembly (5) and screen angle Trim Adjustment Link (9).

I claim:

1. A tool as a means, for lifting, relocating, rotating, and holding a commercially available flat-panel display and other associated personal computer system components in any typical computer operator's optimal viewing and reaching positions, as are necessary to suit the working requirements of said typical computer operator in all computer operator posture positions ranging from sitting upright to fully reclined with face up, and comprising:

(1) a base frame providing overall footprint stability and necessary connecting points for the following structural components, (2) a radial arm which is able to rotate in a plane about a fulcrum point in said base frame, (3) a motorized extendable strut connected at one end to said base frame and connected at another end to said radial arm as a means to vary and set a rotational position of said radial arm, (4) a sliding cantilever arm assembly able to slide along, and be positioned on, said radial arm as a means to locate and carry, (5) a monitor platform capable of angular trim rotational movement and sturdy enough to accept those gravity and other dynamic forces incurred by fastening said commercially available flat-panel display to it, (6) a trim adjustment link as a means to trim adjust the angle of said monitor platform and attached said commercially available flat-panel display, to the desired optimal viewing angle of said typical computer operator, regardless of whether said typical computer operator chooses to work in the seated upright, semi-reclined or fully reclined position, (7) a cpu shelf linked at one end to a shelf leg via a first hinge, the shelf leg being connected to said base frame, and linked at another end to said radial arm via a second hinge, in such a way as to keep said personal computer system components within ergonomic reach of said typical computer operator, regardless of whether said typical computer operator chooses to work in the seated upright, semi-reclined, or fully reclined position, whereby said tool is able to lift and position ergonomically any and all said personal computer components to any desired position as is necessary for optimal screen viewing and other said personal computer component manual manipulation by said typical computer operator while working in any upright seated, through to, any fully reclined head, neck and back supported bodily positions.

2. A flat-panel display locating tool for positioning a flat-panel display at an optimal viewing angle throughout a range of operator seating positions from fully upright to fully reclined, the tool providing rotational, height and tilt adjustment, comprising:

a base frame;

a radial arm, wherein the radial arm is pivotably attached to the base frame at a lower end;

an extendable strut pivotably attached to the radial arm at respective arm and strut upper ends and pivotably attached to the base frame at a lower end, the radial arm and extendable strut forming a triangle in conjunction with the base frame, and wherein the extendable strut includes means for expanding or contracting in length, wherein such expansion or contraction causes radial movement of the radial arm;

a cantilever arm, the cantilever arm being slidably attached to the radial arm;

means for selectively positioning the cantilever arm along the radial arm;

a monitor platform attached to the cantilever arm; and a movable shelf for supporting a personal computer, wherein the shelf moves in conjunction with the radial arm.

3. The flat-panel display locating tool of claim 2, wherein the monitor platform is selectively rotatable about the cantilever arm.

4. The flat-panel display locating tool of claim 2, wherein the monitor platform is selectively rotatable about the cantilever arm by means of a trim adjustment link, whereby the operator may adjust the tilt of the flat-panel display to a desired viewing angle.

5. The flat-panel display locating tool of claim 4, wherein the trim adjustment link is a manually operated link.

6. The flat-panel display locating tool of claim 4, wherein the trim adjustment link is a motorized link.

7. The flat-panel display locating tool of claim 2, wherein the means for selectively positioning the cantilever arm on the radial arm is a motorized length-adjustable link.

8. The flat-panel display locating tool of claim 2, wherein the movable shelf moves to keep the personal computer within ergonomic reach of a computer operator whether the operator is in an upright seated or reclined position.

9. The flat panel display locating tool of claim 2, wherein the movable shelf is hingedly coupled at one end to the radial arm and is hingedly coupled at another end to a shelf leg, the shelf leg having an end coupled to the base frame.

10. The flat-panel display locating tool of claim 2, wherein the extendable strut is varied in length by means of an electrical/mechanical energy system.

11. The flat-panel display locating tool of claim 2, wherein the extendable strut is varied in length by means of a hydraulic energy system.

12. A flat-panel display locating tool for positioning a flat panel display at an optimal viewing angle throughout a range of operator seating positions from fully upright to fully reclined, the tool providing rotational, height and tilt adjustment, comprising:

a base frame;

a radial arm hingedly attached at a lower end to a pivot point on the base frame;

an extendable strut hingedly attached to the radial arm at respective arm and strut upper ends and hingedly attached to the base frame at a lower end, the radial arm and extendable strut forming a triangle in conjunction with the base frame;

a cantilever arm slidably attached to the radial arm;

means for selectively positioning the cantilever arm along the radial arm;

a monitor platform attached to the cantilever arm;

wherein the radial arm is selectively rotatable about the pivot point on the base frame via the extendable strut and the cantilever arm is selectively positionable along the radial arm, whereby an operator may move the flat-panel display into a desired viewing position for the operator's desired seating position; and a movable shelf for supporting a personal computer, wherein the shelf moves to keep the personal computer within ergonomic reach of a computer operator whether the operator is in an upright, seated or reclined position.

13. The flat-panel display locating tool of claim 12, wherein the monitor platform is selectively rotatable about the cantilever arm, whereby the operator may adjust the tilt of the flat-panel display to a desired viewing angle.

14. The flat panel display locating tool of claim 12, wherein the movable shelf is hingedly coupled at one end to the radial arm and is hingedly coupled at another end to a shelf leg, the shelf leg having an end coupled to the base frame.

15. The flat-panel display locating tool of claim 12, wherein the extendable strut may be varied in length by means of electrical/mechanical system.

16. The flat-panel display locating tool of claim 12, wherein the extendable strut may be varied in length by means of a hydraulic system.

17. The flat-panel display adjusting tool of claim 12, wherein the means for selectively positioning the cantilever arm on the radial arm is a motorized length-adjustable link.

* * * * *